F. A. SCHUSTER.
PIPE DRAWING MACHINE.
APPLICATION FILED FEB. 3, 1910.
977,135.
Patented Nov. 29, 1910.
2 SHEETS—SHEET 1.
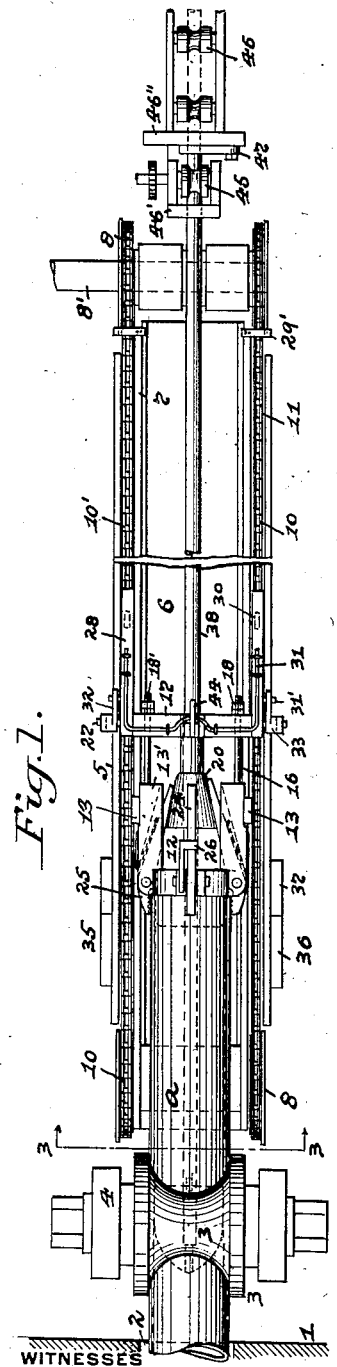
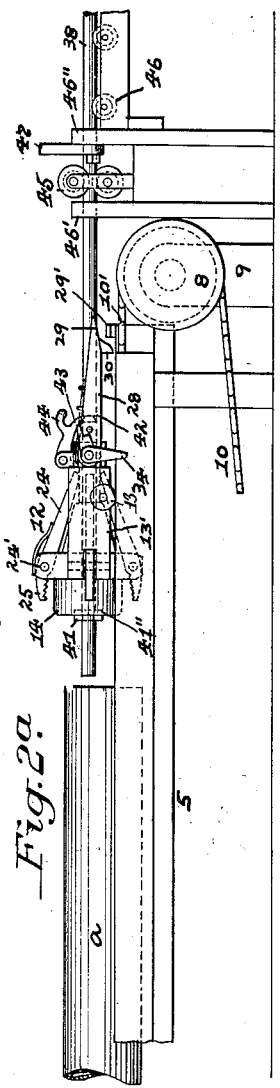
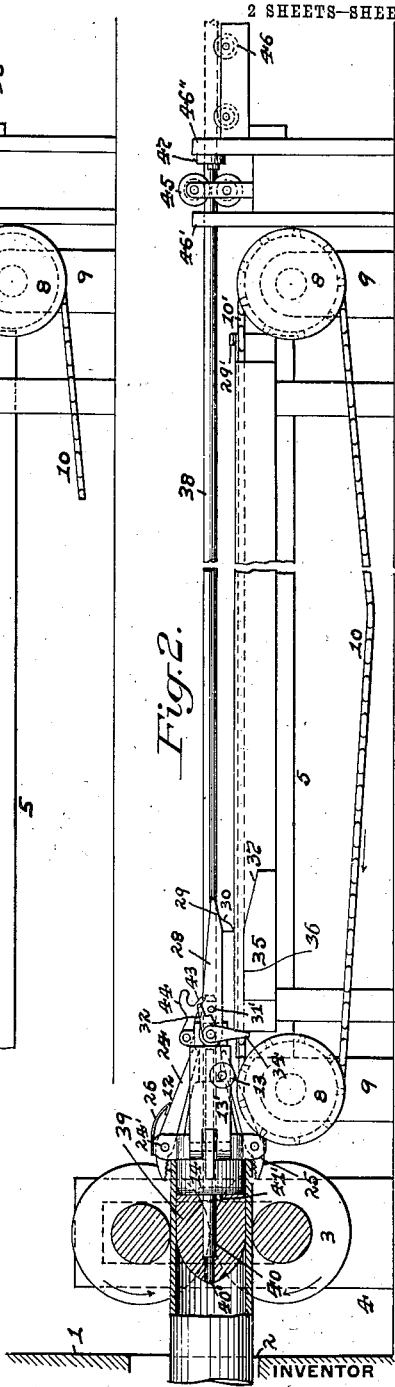

F. A. SCHUSTER.
PIPE DRAWING MACHINE.
APPLICATION FILED FEB. 3, 1910.
977,135.
Patented Nov. 29, 1910.
2 SHEETS—SHEET 2.
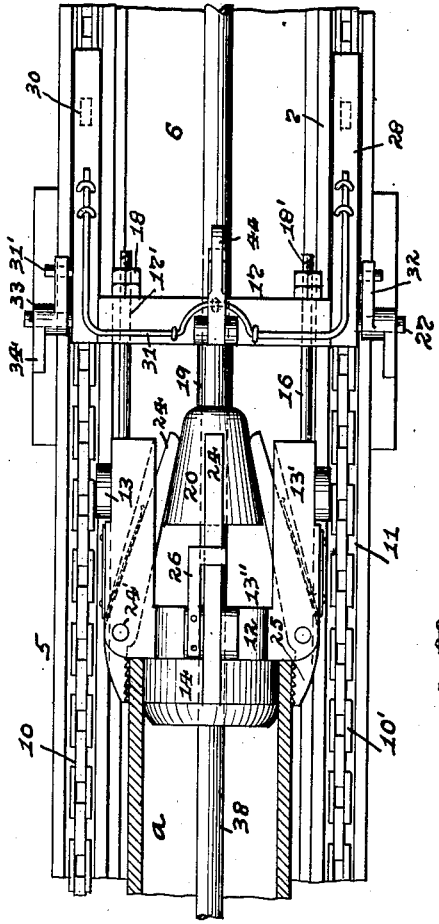
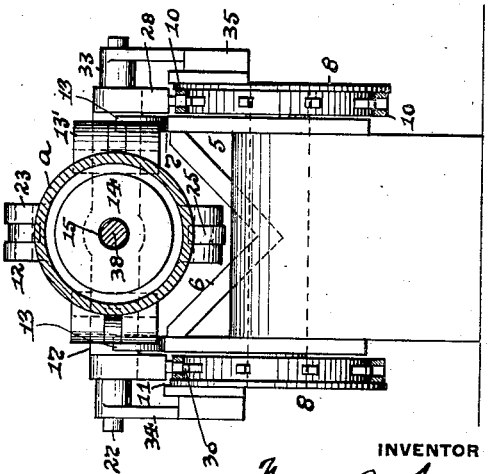
WITNESSES
INVENTOR

UNITED STATES PATENT OFFICE.

FRANK A. SCHUSTER, OF SHARPSBURG, PENNSYLVANIA.

PIPE-DRAWING MACHINE.

977,135.

Specification of Letters Patent.

Patented Nov. 29, 1910.

Application filed February 3, 1910. Serial No. 541,717.

*To all whom it may concern:*

Be it known that I, FRANK A. SCHUSTER, a resident of Sharpsburg, in the county of Allegheny and State of Pennsylvania, have invented a new and useful Improvement in Pipe-Drawing Machines; and I do hereby declare the following to be a full, clear, and exact description thereof.

My invention relates to pipe drawing machines, and has special reference to such machines for use in the drawing of what is known as "lap weld" pipe.

The main object of my invention is to provide a cheap, simple and efficient pipe drawing machine which will prevent the pipe from sticking in the welding rolls in the drawing of the skelp through such rolls in forming the pipe, and thereby prevent the loss of such pipe or mandrel through such sticking.

Another object of my invention is to provide such a device which when drawing the pipe will prevent the pipe as it is being welded by the rolls from sagging, or dropping down at the welded end, and thereby overcoming any kinking in such pipe as formed.

A further object of the invention is to provide such a device which will draw the pipe through the welding rolls and overcome the chipping or roughing up of the rolls to catch the pipe, as is generally employed, and thereby enable the employment of smooth rolls to form smooth and finished pipe, instead of pipe having marks or other imperfections through prints or indentations thereon from such roughened rolls.

My invention consists, generally stated, in the novel arrangement, construction and combination of parts, as hereinafter more specifically set forth and described and particularly pointed out in the claims.

To enable others skilled in the art to which my invention appertains to construct and use my improved pipe drawing machine, I will describe the same more fully, referring to the accompanying drawings, in which—

Figure 1 is a top plan view of my improved pipe drawing machine. Fig. 2 is a side elevation of the same with the parts in position at the beginning of the operation of welding the pipe. Fig. 2ª is a like view showing the position of the parts after the operation of welding the pipe is completed. Fig. 3 is an enlarged cross-section on the line 3—3 Fig. 1 looking in the direction of the arrows. Fig. 4 is an enlarged side view of the gripping device, with some of the parts in section and broken away. Fig. 5 is an enlarged plan view of the gripping device.

Like symbols of reference herein indicate like parts in each of the figures of the drawings.

As illustrated in the drawings, 1 represents a portion of the usual furnace for heating the skelp to be formed into pipe, and 3 the usual grooved rolls, which are located in front of the opening or mouth 2 of such furnace and within their housings 4. In front of the rolls 3 is the draw bench 5 having the usual V-shaped trough 6 within the same and the tracks 7 on each side of said trough. At each end of the bench 5 are the sprocket-wheels 8, which are mounted in the standards or bearings 9, and the sprocket-chains 10 pass around and engage with said wheels, while the upper portions 10' of said chains travel through the grooved portions 11 in the upper part of said bench and beyond the tracks 7.

Mounted upon the draw bench 5 is the pipe gripping device 12, which is adapted to travel upon the tracks 7 on said bench through the rollers or wheels 13 journaled on the side portions 13' formed on the supporting frame or body 13'' of said device, and projecting from the rear end of such frame is the annular head 14 having the hole 15 passing centrally through the same. Extending out from the front ends of the side portions 13' of the body 13 are the draft bars 16 for supporting the sliding frame 17 through holes 17' in said frame, and the front end of such bars beyond the frame 17 are threaded, as at 18' for the receiving of jam-nuts 18 to adjust and limit the movement of said frame. Extending rearward of the sliding frame 17 and connected centrally thereto through the hole 22 by a tubular portion 19, is the cone 20, which is provided with a hole 21 centrally through the same for connecting with said tubular portion, while pivotally mounted at 24' on the body 13'' of the device 12 through bearings 23 are the gripping levers 24, which are provided with the jaws 25 at their rear ends for extending over the head 14, and the front ends of such levers are adapted to engage with the cone 20 carried by the frame 17. Springs 26 are secured to the bearings 23 for engaging with the levers 24 to hold the jaws 25 open in the normal positions of said levers.

Extending out from each end of the frame 17 is a shaft 27, which has an arm 28 loosely mounted thereon and provided with an inclined outer end 29 leading up from a lug 30 on the under face of the same and adapted to engage with a trip 29' on each side of the front end of the bench 5. Each of the arms 28 are held normally in their raised positions by a spring 31 secured on the frame 17 and engaging with each of said arms, and extending out from each side of said arms is a stop pin 31' which is adapted to be engaged by one arm 32 on the bell-crank levers 33 loosely mounted on the shafts 27 beyond the arms 28, as hereinafter described. Another arm 34 on the levers 33 extends out at right angles to the arm 32 and is adapted to engage with a stop 35 located at the rear of the bench 5 and on each side of the same, and with the upper face 36 of said stop and the downwardly inclined portion 37 at the front end thereof, as hereinafter described.

Extending through the holes 15 and 21 in the head 14 and cone 20 respectively, and through the tubular portion 19 and hole 22 in the sliding frame 17, is the usual ball-bar 38, which is adapted to carry the welding mandrel or ball 39 at its rear end by fitting within a hole 40 centrally of said ball and against a contracted portion 40' of said hole. This bar 38 is also provided with a key 41 for fitting within a seat 41' in the ball 39 and within a like seat 41'' in the head 14 in different positions of said bar, and is also provided with an annular shoulder 42 thereon for engaging with a dog 43 pivoted centrally on the frame 17, as hereinafter described, and having an operating handle 44 thereon. The rear end of the ball-bar 38 passes between the usual pinching rolls 45 located at the front end of the bench 5 and through the usual guides 46' and 46'' and onto the idle rollers 46 in front of said rolls in the ordinary manner, while the usual stop bar 47 is pivoted on said guide 46'' for fitting against the front end of the ball-bar 38 to hold such bar 38 in position during the welding operation, as hereinafter described.

The operation of my improved pipe drawing machine is as follows: With the rolls 3 revolving in the usual manner in the direction of the arrows, and with the chains 10 moving in the direction of the arrows idly at a faster speed than such rolls through the medium of the sprocket-wheels 8 engaging therewith and driven by the shaft 8' connecting the front wheels 8, the machine is ready for the welding operation. The ball-bar 38 being in its withdrawn position, as shown in Fig. 2ª, so that upon the same being moved toward the rolls 3 by the revolving of the pinching rolls 45 engaging therewith and with the dog 43 on the frame 17 being in engagement with the shoulder 42 on said bar, the device 12 will move with said bar along the bench 5 by the rollers 13 on said device traveling along the tracks 7 on said bench to the position shown in Fig. 2, while such bar will be held in this position during the welding operation by the stop bar 47 being placed against the front end of the same. During this rearward movement of the device 12 with the ball-bar 38 the arms 32 on the levers 33 will be freed from the pins 31' on the spring arms 28 by the arms 34 on said levers passing up the inclined portions 37 and along the upper faces 36 of the stops 35, and when the device 12 is in such position as shown in Fig. 2 the arms 34 will drop down in the rear of said stops, so that the arms 32 will be in position for engaging with said pins 31'. With the ball 39 placed in its usual position on the front end of the ball-bar 38 and between the rolls 3 in the usual manner, the key 41 on said bar will be in its seat 41' in said ball and the skelp for forming the pipe can then be fed from the furnace 1 in the usual manner and through the mouth 2 of the same to the rolls 3. As the front end of the skelp reaches the rolls 3 it passes over the ball 39 on the bar 38 and is welded against said ball by such rolls at its side edges in the ordinary manner to form the pipe *a*, and when such welded end of the pipe has passed through said rolls it passes over the head 14 on the gripping device 12 and strikes against the side portions 13' and bearings 23 on the body 13 of said device, which will thereby move said device along the bench 5 by its rollers 13 engaging the tracks 7 during such movement of the pipe *a* in being welded. This forward movement of the device 12 will turn the bell-crank levers 33 on the shafts 27 to allow the arms 32 on said levers to be thrown forward and engage with the pins 31' on the spring arms 28, while the arms 34 on said levers will be thrown back and move along the faces 36 on the stops 35, and thus throw down the said arms 28 to allow the lugs 30 on said arms to catch in the chains 10, as shown in Figs. 1 and 4. While the pipe *a* is still being welded and moving through the rolls 3, the gripping device 12 is also still being moved forward along the bench 5 by the chains 10 engaging with said device through the lugs 30 on the spring arms 28, and when the arms 34 on the levers 33 pass over the inclined faces 37 on the stops 3, the said arms will resume their vertical normal positions, while the arms 32 on said levers will be raised and freed from the pins 31'. By reason of these chains 10 moving faster than the rolls 3 and pipe $a$, the sliding frame 17 on the device 12 will be moved along the bars 16, which will thereby draw the cone 20 forward with such frame and move out the levers 24 engaging therewith, so that the jaws 25 on said levers will be drawn inward and grip the forward end of the pipe $a$ on the head 14 of such device. Any suitable device can be connected to the shaft 8' for driving the sprocket-wheels 8 connecting the chains 10, so that after the jaws 25 have thus gripped the pipe $a$ the speed of such chains will slow down to the same speed as the rolls 3, which is naturally accomplished where an electric motor is used on said shaft for driving said sprocket-wheels, but when said shaft is being driven through gearing, a friction clutch will have to be interposed in said shaft to allow for such slowing down of said chains. Through the jaws 25 thus gripping the pipe $a$ and the gripping device 12 being connected to the chains 10 through the spring arms 28, the skelp is drawn from the furnace $a$ through the rolls 3 and the same welded on the ball 39 to form the full length of pipe $a$, and when such length has been so formed and the inclined ends 29 on the arms 28 reach the trips 29' on the bench 5 such arms will be raised thereby. In this raising of the arms 28 the lugs 30 thereon will be also freed from the chains 10 and will be further raised to their normal positions by the spring 31, so that when the pipe $a$ has been thus formed and freed from the rolls 3 and ball 39, the stop bar 47 can be freed from the front end of the ball-bar 38 and by reversing the revolutions of the pinching rolls 45, such ball-bar can be drawn forward through guide 46' onto the rollers 46 and through the head 14, frame 17 and cone 20, so that the key 41 will be freed from the seat 41' in the ball 39 and strike against the head 14 on the device 12, which will draw said device forward and thereby release the forward ends of the levers 24 from the cone 20 on said device. At the same time the jaws 25 on the levers 24 will be freed from the pipe $a$ and the head 14 on the device 12 will be withdrawn from said pipe. This withdrawing of the ball-bar 38 will permit the ball 39 to drop down between the rolls 3 and bench 5 in the usual manner and the pipe $a$ can also then drop down in the trough 6 of the bench 5, as shown in Fig. 2$^a$ by the freeing of the head 14 on the gripping device therefrom, and then such pipe can be removed therefrom in the usual manner, after which the parts are ready for another operation of welding and drawing another pipe and such operations made continuously.

It will be obvious that the employment of my improved pipe drawing machine will require only a short "pusher" to push the pipe skelp into the welding rolls from the furnace in what is known as the "back-charging" practice generally employed in this class of work instead of the customary long "pusher," which is required to push the skelp all the way through the furnace and rolls, and thus thereby overcome the bending of the "pusher" through the "sticking" of the skelp in the rolls while it is being formed into the pipe. The adjustment of movement of the sliding frame on the gripping device provides for different thicknesses of metal in the pipe being welded and will also provide for any wear on the pipe gripping jaws or head on such device, while at the same time after the pipe has been gripped the draft is taken upon the bars supporting said frame by such frame coming against the jam-nuts in said bars. Different sizes of devices or heads can be provided for different diameters of pipe, and such devices or heads can be easily and quickly placed upon or removed from the bench and around the ball-bar. It will thus be seen that my improved pipe drawing machine is rapid and convenient in all its operations or movements and provides for gripping the pipe as soon as it leaves the welding rolls, as well as enabling the drawing or pulling device for such pipe to be set in motion by such pipe, as it is being welded and moving through such rolls in the ordinary manner. The device being movable along the ball-bar will insure a central draft on the device and will be tripped automatically by the action of such bar, while such device being movable along the bench through its wheels or rollers it can be pushed up to the welding rolls by such bar. The gripping levers for the pipe are insured of being held normally open through being spring operated, so as to receive the pipe, and are closed through the action of the cone device engaging between the tails of the same, which will rigidly and securely hold such pipe on the gripping and drawing device, and thereby insure the pipe to be drawn through the welding rolls in the movement of such device.

Although four gripping levers are shown as being applied to the pipe in the drawing operation of the same, this specific number is not requisite, as two or more such levers can be used, the number depending upon the size of pipe to be drawn, and various other modifications and changes in the design and operation of my improved pipe drawing machine may be resorted to, within the scope of the appended claims, without departing from the spirit of the invention, or sacrificing any of its advantages.

What I claim as my invention and desire to secure by Letters Patent is—

1. In a machine for drawing lap-weld pipe, the combination of welding rolls having a welding ball within the same, a ball-bar for carrying said ball, and a gripping device on and movable along said bar for engaging with one end of the pipe after it emerges from such rolls to draw said pipe during its welding operation.

2. In a machine for drawing lap-weld pipe, the combination with welding rolls having a welding ball within the same, a ball-bar for carrying said ball, of a gripping device on and movable along said bar for engaging with one end of the pipe after it emerges from such rolls to draw said pipe during its welding operation, and power-driven means adapted to be connected to said device for moving the same in the welding operation.

3. In a machine for drawing lap-weld pipe, the combination with welding rolls having a welding ball within the same, a ball-bar for carrying said ball, of a gripping device on and movable along said bar for engaging with one end of the pipe after it emerges from such rolls to draw said pipe during its welding operation, and power-driven chains adapted to be connected to said device for moving the same in the welding operation.

4. In a machine for drawing lap-weld pipe, the combination with welding rolls having a welding ball within the same, a ball-bar for carrying said ball, of a gripping device on and movable along said bar for engaging with one end of the pipe after it emerges from such rolls to draw said pipe during its welding operation, power-driven chains, and spring operated arms on said device for engaging with said chains to move said device in the welding operation.

5. In a machine for drawing lap-weld pipe, the combination with welding rolls having a welding ball within the same, a ball-bar for carrying said ball, of a gripping device on and movable along said bar for engaging with one end of the pipe after it emerges from such rolls to draw said pipe during its welding operation, power-driven chains, means on said device for engaging with said chains to move said device in the welding operation, means for releasing said device, and means for closing the device on the pipe for the welding operation.

6. In a machine for drawing lap-weld pipe, the combination with welding rolls having a welding ball within the same, a ball-bar for carrying said ball, of a gripping device on and movable along said bar for engaging with one end of the pipe after it emerges from such rolls to draw said pipe during its welding operation, power-driven chains, and movable means on said device having means for engaging with said chains to move said device in the welding operation, means for releasing said device, and means for closing the device on the pipe for the welding operation.

7. In a machine for drawing lap-weld pipe, the combination with welding rolls having a welding-hole within the same, a ball-bar for carrying said ball, of a device on and movable along said bar having gripping levers for engaging with one end of the pipe after it emerges from the rolls to draw said pipe during the welding operation, power-driven chains, a movable frame on said device having means for engaging with said chains to move said device in the welding operation, and a cone on said frame for engaging with said levers to close the same on the pipe for the welding operation.

8. In a machine for drawing lap-weld pipe, the combination with welding rolls having a welding ball within the same, a ball-bar for carrying said ball, of a gripping device on and movable along said bar for engaging with one end of the pipe after it emerges from such rolls to draw said pipe in its welding operation, power-driven chains, spring-operated arms on said device for engaging with said chains to move said device in the welding operation, and means for engaging with said arms to connect the same with said chains.

9. In a machine for drawing lap-weld pipe, the combination with welding rolls having a welding ball within the same, a ball-bar for carrying said ball, of a gripping device on and movable along said bar for engaging with one end of the pipe after it emerges from such rolls to draw said pipe in its welding operation, power-driven chains, spring-operated arms on said device for engaging with said chains to move said device in the welding operation, and levers on said arms for engaging with the same and with stops to connect said arms with said chains.

10. In a machine for drawing lap-weld pipe, the combination with welding rolls having a welding ball within the same, a ball-bar for carrying said ball, of a gripping device on and movable along said bar for engaging with one end of the pipe after it emerges from such rolls to draw said pipe in its welding operation, power-driven chains, spring-operated arms on said device for engaging with said chains to move said device in the welding operation, means for engaging with said arms to connect the same with said chains, and means for disconnecting said arms from said chains.

11. In a machine for drawing lap-weld pipe, the combination with welding rolls having a welding ball within the same, a ball-bar for carrying said ball, of a gripping device on and movable along said bar for engaging with one end of the pipe after it emerges from such rolls to draw said pipe in its welding operation, power-driven chains, spring-operated arms on said device for engaging with said chains to move said device in the welding operation, means for engaging with said arms to connect the same with said chains, and tripping means for disconnecting said arms from said chains.

12. In a machine for drawing lap-weld pipe, the combination with welding rolls having a welding ball within the same, a ball-bar for carrying said ball, of a gripping device on and movable along said bar for engaging with one end of the pipe after it emerges from such rolls to draw said pipe in its welding operation, power-driven chains, spring-operated arms on said device for engaging with said chains to move said device in the welding operation, means for engaging with said arms to connect the same with said chains, and a tripping bar extending over said chains for engaging with said arms to disconnect the same from said chains.

13. In a machine for drawing lap-weld pipe, the combination of welding rolls having a welding ball within the same, a ball-bar for carrying said ball, a gripping device on and movable along said bar for engaging with one end of the pipe after it emerges from such rolls to draw said pipe during its welding operation, and means for moving said device in the movement of such bar for the welding operation and for the positioning of said device for the gripping of the pipe.

14. In a machine for drawing lap-weld pipe, the combination of welding rolls having a welding ball within the same, a ball-bar for carrying said ball, a gripping device on and movable along said bar for engaging with one end of the pipe after it emerges from such rolls to draw said pipe during its welding operation, and means on said device for engaging with said bar to permit said device to move with said bar for the welding operation and for the positioning of said device for the gripping of the pipe.

15. In a machine for drawing lap-weld pipe, the combination of welding rolls having a welding ball within the same, a ball-bar for carrying said ball, a gripping device on and movable along said bar for engaging with one end of the pipe after it emerges from such rolls to draw said pipe during its welding operation, and a dog pivoted on said device for engaging with a shoulder on said bar to permit said device to move with said bar for the welding operation and for the positioning of said device for the gripping of the pipe.

16. In a machine for drawing lap-weld pipe, the combination of welding rolls having a welding ball within the same, a ball-bar for carrying said ball, a device on and movable along said bar having gripping levers for engaging with one end of the pipe after it emerges from such rolls to draw said pipe during its welding operation, and means for withdrawing said device, and means for opening said levers to permit the pipe to be freed from said device after being welded.

17. In a machine for drawing lap-weld pipe, the combination of welding rolls having a welding ball within the same, a ball-bar for carrying said ball, a device on and movable along said bar having gripping levers for engaging with one end of the pipe after it emerges from such rolls to draw said pipe during its welding operation, and means operative through the movement of said bar for withdrawing said device, and means for opening said levers to permit the pipe to be freed from said device after being welded.

18. In a machine for drawing lap-weld pipe, the combination of welding rolls having a welding ball within the same, a ball-bar for carrying said ball, a device on and movable along said bar having gripping levers for engaging with one end of the pipe after it emerges from such rolls to draw said pipe during its welding operation, and means for engaging with said device in the movement of said bar to withdraw said device, and means to open said levers so as to permit the pipe to be freed from said device after being welded.

19. In a machine for drawing lap-weld pipe, the combination of welding rolls having a welding ball within the same, a ball-bar for carrying said ball, a device on and movable along said bar having gripping levers for engaging with one end of the pipe after it emerges from such rolls to draw said pipe during its welding operation, and a key on said ball-bar for engaging with said device in the movement of said bar to withdraw said device, and means to open said levers so as to permit the pipe to be freed from said device after being welded.

20. In a machine for drawing lap-weld pipe, the combination of welding rolls having a welding ball within the same, a ball-bar for carrying said ball, a gripping device on and movable along said bar for engaging with one end of the pipe after it emerges from such rolls to draw said pipe during its welding operation, and power driven means adapted to be connected to said device to engage the device with the pipe and move said device during the welding operation.

21. In a machine for drawing lap-weld pipe, the combination of welding rolls having a welding ball within the same, a ball-bar for carrying said ball, a gripping device on and movable along said bar for engaging with one end of the pipe after it emerges from such rolls to draw said pipe during its welding operation, power-driven chains, and means on said device adapted to be connected to said chains for engaging the device with the pipe and moving said device during the welding operation.

22. In a machine for drawing lap-weld pipe, the combination with welding rolls having a welding ball within the same, a ball-bar for carrying said ball, of a gripping device on and movable along said bar for engaging with one end of the pipe after it emerges from such rolls to draw said pipe during its welding operation, power-driven chains, and spring operated arms on said device adapted to be connected to said chains for engaging the device with said pipe and moving said device during the welding operation.

23. In a machine for drawing lap-weld pipe, the combination with welding rolls having a welding ball within the same, a ball-bar for carrying said ball, of a gripping device on and movable along said bar for engaging with one end of the pipe after it emerges from such rolls to draw said pipe during its welding operation, power-driven chains, means on said device adapted to be connected to said chains for engaging the device with the pipe and moving said device during the welding operation, means for releasing said device, and means for closing the device on the pipe for the welding operation.

24. In a machine for drawing lap-weld pipe, the combination with welding rolls having a welding ball within the same, a ball-bar for carrying said ball, of a gripping device on and movable along said bar for engaging with one end of the pipe after it emerges from such rolls to draw said pipe during its welding operation, power-driven chains, movable means on said device having means adapted to be connected to said chains for engaging the device with the pipe and moving said device during the welding operation, means on said movable means for releasing said device, and means for closing the device on the pipe during the welding operation.

25. In a machine for drawing lap-weld pipe, the combination with welding rolls having a welding-hole within the same, a ball-bar for carrying said ball, of a device on and movable along said bar having gripping levers for engaging with one end of the pipe after it emerges from the rolls to draw said pipe during the welding operation, power-driven chains, a movable frame on said device having means adapted to be connected to said chains for engaging said levers with the pipe and moving said device during the welding operation, and means on said frame for releasing said levers, and means for closing the levers on the pipe for the welding operation.

26. In a machine for drawing lap-weld pipe, the combination with welding rolls having a welding-hole within the same, a ball-bar for carrying said ball, of a device on and movable along said bar having gripping levers for engaging with one end of the pipe after it emerges from the rolls to draw said pipe during the welding operation, power-driven chains, a movable frame on said device having means adapted to be connected to said chains for engaging said levers with the pipe and moving said device during the welding operation, and a cone on said frame for engaging with said levers to close the same on the pipe for the welding operation.

27. In a machine for drawing lap-weld pipe, the combination with welding rolls having a welding-hole within the same, a ball-bar for carrying said ball, of a device on and movable along said bar having gripping levers for engaging with one end of the pipe after it emerges from the rolls to draw said pipe during the welding operation, power-driven chains, a movable frame on said device having spring operated arms adapted to be connected to said chains for engaging said levers with the pipe and moving said device during the welding operation, and means on said frame for releasing said levers, and means for closing the levers on the pipe for the welding operation.

28. In a machine for drawing lap-weld pipe, the combination with welding rolls having a welding ball within the same, a ball-bar for carrying said ball, of a gripping device on and movable along said bar for engaging with one end of the pipe after it emerges from such rolls to draw said pipe in its welding operation, power-driven chains, spring-operated arms on said device adapted to be connected to said chains for engaging the device with the pipe and moving said device during the welding operation, and means for engaging with said arms to connect the same with said chains.

29. In a machine for drawing lap-weld pipe, the combination with welding rolls having a welding ball within the same, a ball-bar for carrying said ball, of a gripping device on and movable along said bar for engaging with one end of the pipe after it emerges from such rolls to draw said pipe in its welding operation, power-driven chains, spring-operated arms on said device adapted to be connected to said chains for engaging the device with the pipe and moving said device during the welding operation, and levers for engaging the arms to connect the same with said chains.

30. In a machine for drawing lap-weld pipe, the combination with welding rolls having a welding ball within the same, a ball-bar for carrying said ball, of a gripping device on and movable along said bar for engaging with one end of the pipe after it emerges from such rolls to draw said pipe in its welding operation, power-driven chains, spring-operated arms on said device adapted to be connected to said chains for engaging the device with the pipe and moving said device during the welding operation, and levers for engaging with said arms and with stops to connect said arms with said chains.

31. In a machine for drawing lap-weld pipe, the combination with welding rolls having a welding ball within the same, a ball-bar for carrying said ball, of a gripping device on and movable along said bar for engaging with one end of the pipe after it emerges from such rolls to draw said pipe in its welding operation, power-driven chains, spring-operated arms on said device adapted to be connected to said chains for engaging the device with the pipe and moving said device during the welding operation, means for engaging with said arms to connect the same with said chains, and means for disconnecting said arms from said chains.

32. In a machine for drawing lap-weld pipe, the combination with welding rolls having a welding ball within the same, a ball-bar for carrying said ball, of a gripping device on and movable along said bar for engaging with one end of the pipe after it emerges from such rolls to draw said pipe in its welding operation, power-driven chains, spring-operated arms on said device adapted to be connected to said chains for engaging the device with the pipe and moving said device during the welding operation, tripping means for engaging with said arms to connect the same with said chains, and means for disconnecting said arms from said chains.

33. In a machine for drawing lap-weld pipe, the combination with welding rolls having a welding ball within the same, a ball-bar for carrying said ball, of a gripping device on and movable along said bar for engaging with one end of the pipe after it emerges from such rolls to draw said pipe in its welding operation, power-driven chains, spring-operated arms on said device adapted to be connected to said chains for engaging the device with the pipe and moving said device during the welding operation, means for engaging with said arms to connect the same with said chains, and a tripping bar extending over said chains for engaging with said arms to disconnect the same from said chains.

In testimony whereof, I, the said FRANK A. SCHUSTER, have hereunto set my hand.

FRANK A. SCHUSTER.

Witnesses:
 JAMES L. WEYN,
 J. N. COOKE.